US009519683B1

(12) United States Patent
Samaddar et al.

(10) Patent No.: US 9,519,683 B1
(45) Date of Patent: Dec. 13, 2016

(54) INFERRING SOCIAL AFFINITY BASED ON INTERACTIONS WITH SEARCH RESULTS (75) Inventors: Sumitro Samaddar, Cupertino, CA (US); Matthew E. Kulick, San Francisco, CA (US); Maureen Heymans, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 769 days.

(21) Appl. No.: 13/604,818

(22) Filed: Sep. 6, 2012

Related U.S. Application Data (60) Provisional application No. 61/531,182, filed on Sep. 6, 2011.

(51) Int. Cl.
*G06F 17/30* (2006.01)
(52) U.S. Cl.
CPC ..... *G06F 17/3053* (2013.01); *G06F 17/30864* (2013.01); *G06F 17/30867* (2013.01)
(58) Field of Classification Search
CPC ............ G06F 17/3053; G06F 17/30867; G06F 17/30864
USPC ........................................ 707/723, 727, 767
See application file for complete search history.

(56) References Cited

U.S. PATENT DOCUMENTS 8,307,086 B2 * 11/2012 Whitnah et al. ............... 709/226
8,533,013 B2 * 9/2013 Cole .............................. 705/7.32
2012/0078916 A1 * 3/2012 Tseng ............................ 707/748
2012/0143921 A1 * 6/2012 Wilson et al. ................. 707/798
2012/0324004 A1 * 12/2012 Le et al. ........................ 709/204
2013/0036109 A1 * 2/2013 Kulick et al. ................. 707/722

OTHER PUBLICATIONS

U.S. Appl. No. 11/935,791, filed Nov. 6, 2007.
U.S. Appl. No. 12/898,608, filed Oct. 5, 2010.
U.S. Appl. No. 61/383,696, filed Sep. 16, 2010.
U.S. Appl. No. 13/482,525, filed May 29, 2012.
U.S. Appl. No. 61/491,600, filed May 31, 2011.
U.S. Appl. No. 13/419,606, filed Mar. 14, 2012.
U.S. Appl. No. 61/452,677, filed Mar. 15, 2011.
U.S. Appl. No. 12/909,809, filed Oct. 21, 2010.
U.S. Appl. No. 61/253,831, filed Oct. 21, 2009.
U.S. Appl. No. 12/756,072, filed Apr. 7, 2010.
U.S. Appl. No. 61/302,534, filed Feb. 8, 2010.
U.S. Appl. No. 12/900,901, filed Oct. 8, 2010.
U.S. Appl. No. 13/314,773, filed Dec. 8, 2011.
U.S. Appl. No. 13/563,318, filed Jul. 31, 2012.

* cited by examiner

*Primary Examiner* — Vincent Boccio
(74) *Attorney, Agent, or Firm* — Fish & Richardson P.C.

(57) ABSTRACT

Techniques for inferring social affinity may include the following operations: obtaining information derived from online activity of a first party, where the online activity includes searches initiated by the first party, and where the information specifies interaction of the first party with content accessed through the online activity; determining, based on the information, that an amount of the interaction of the first party with the content exceeds a threshold; following the determining, identifying a second party who provided the content; adjusting, in a social graph for the first party, an affinity of the second party to the first party based on the amount of the interaction with the content; and using the affinity to promote search results output to the first party that contain content that is provided by the second party.

16 Claims, 6 Drawing Sheets

FIG. 6

INFERRING SOCIAL AFFINITY BASED ON INTERACTIONS WITH SEARCH RESULTS

CROSS-REFERENCE TO RELATED APPLICATION

Priority is hereby claimed to U.S. Provisional Application No. 61/531,182, which was filed on Sep. 6, 2011. The contents of U.S. Provisional Application No. 61/531,182 are hereby incorporated by reference into this disclosure.

BACKGROUND

This specification relates generally to inferring social affinity based on interactions with search results.

Search engines identify resources (e.g., images, audio, video, Web pages, text, documents) that are relevant to a user's needs and present information about the resources in a manner that is useful to the user. For example, a search engine returns a set of search results in response to a user submitted query. A user may give more weight to search results that are associated with reviews, opinions, or other content associated with the user's social graph (e.g., contacts of the user).

SUMMARY

Examples of techniques for inferring social affinity may include the following operations: obtaining information derived from online activity of a first party, where the online activity includes searches initiated by the first party, and where the information specifies interaction of the first party with content accessed through the online activity; determining, based on the information, that an amount of the interaction of the first party with the content exceeds a threshold; following the determining, identifying a second party who provided the content; adjusting, in a social graph for the first party, an affinity of the second party to the first party based on the amount of the interaction with the content; and using the affinity to promote search results output to the first party that contain content that is provided by the second party. The example techniques may include one or more of the following example features, either alone or in combination.

The affinity may be a positive affinity, and using the affinity in promoting search results may include ranking future search results associated with the second party as being more relevant than future search results not associated with the second party. The operations may include taking into account relevance to search terms in the content associated with the second party when ranking the future search results associated with the second party.

The interaction may be failure to select the content and, as a result, the affinity is a negative affinity. Using the affinity to promote search results may include ranking future search results associated with the second party as being less relevant than future search results not associated with the second party.

The affinity may be used both in promoting search results output to the first party, and to affect an online social connection between the first party and the second party. The affinity of the first party to the second party may fall along a spectrum, and a degree to which promoting search results is affected by the affinity corresponds to where, on the spectrum, the affinity falls.

The foregoing operations may include using the affinity to affect a social connection between the first party and the second party. The social connection may be used to promote the search results. Affecting the social connection may include promoting an online social connection between the first party and the second party by suggesting that the first party connect to the second party through a social networking service. If the first party and the second party are previously connected through an online social network, affecting the social connection may include promoting the online social connection by providing the first party with an option to increase the online social connection between the first party and the second party.

Advantages of the foregoing technique may include providing users with opportunities for information and/or social connects based on their online interactions. Such opportunities might otherwise have been unknown to the user.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are techniques for inferring an affinity of a first party for a second party based on repeated online activity of the first party; and for promoting content of the second party to the first party in accordance with the affinity. By way of example, a first party, John, may perform online searches for camping information for northern California. John frequently selects (e.g., clicks on) search results, which may include articles, blog posts, photographs, and the like, published on the Internet across a variety of different Web sites. In some implementations, a system determines that the selected search results have a single user/author named Jane. For example, an author can include anyone who created, commented on, endorsed, is responsible for disseminating the content, etc. In this regard, a "party" is not limited to a person, but rather may include, e.g., companies, entities, services, or the like, to which affinity and connection may be made.

In this example, certain criteria are met, e.g., a sufficient number of content selections by John pertaining to Jane, and the system infers that John is likely interested in seeing more content from Jane in the future. In other words, the system infers that John has a positive affinity for Jane. Accordingly, in the future, the system will promote content for John that is obtained from (e.g., authored by) Jane. For example, in response to a search query from John, the system may rank content from Jane as more likely to be relevant than content obtained from third parties. As described below, the promotion of content may take other factors into account, for example, how closely keywords that John has entered match content provided by Jane. In this regard, the examples described herein use keyword in the search queries. However, the processes described herein can be used with other types of search queries that do not include keyword, e.g., image-based search queries.

The system may also promote a social connection between John and Jane. For example, the system may suggest that John and Jane become contacts on a social networking service, or that John follow Jane on a social networking service. In cases where John and Jane are already connected by a social networking service, the system may promote tighter integration between the two. For example, if John and Jane are already contacts on a first social networking service, the system may suggest that John follow Jane on a second social networking service.

The system may also adjust the affinity between two parties based, at least in part, on online activity of one of the parties. For example, John and Jane above do actually connect through a social networking service. In response, the system assigns a positive affinity between John and Jane. As a result, Jane often sees, in her search results, content authored by (or otherwise associated with) John. Jane, however, frequently avoids selecting (e.g., clicking on) content authored by John for one reason or another. Over time, the system infers that Jane dislikes John and, therefore, that Jane has a negative affinity for John. The extent of the negative affinity that Jane has for John may depend on a number of factors, examples of which include the number of times that Jane ignores content from John, negative comments that Jane makes online about John or his content, and so on. Over time, in searches conducted by Jane, the system promotes less content from John. For example, the system may rank content from John lower in a search results list than content from third parties. The system may also reduce the social connection between John and Jane, e.g., by removing one or more connecting edges of their social graphs.

The process illustrated above may be implemented in an appropriate network environment, with appropriate devices and computing equipment. An example of such an environment is described below.

Figure 1:
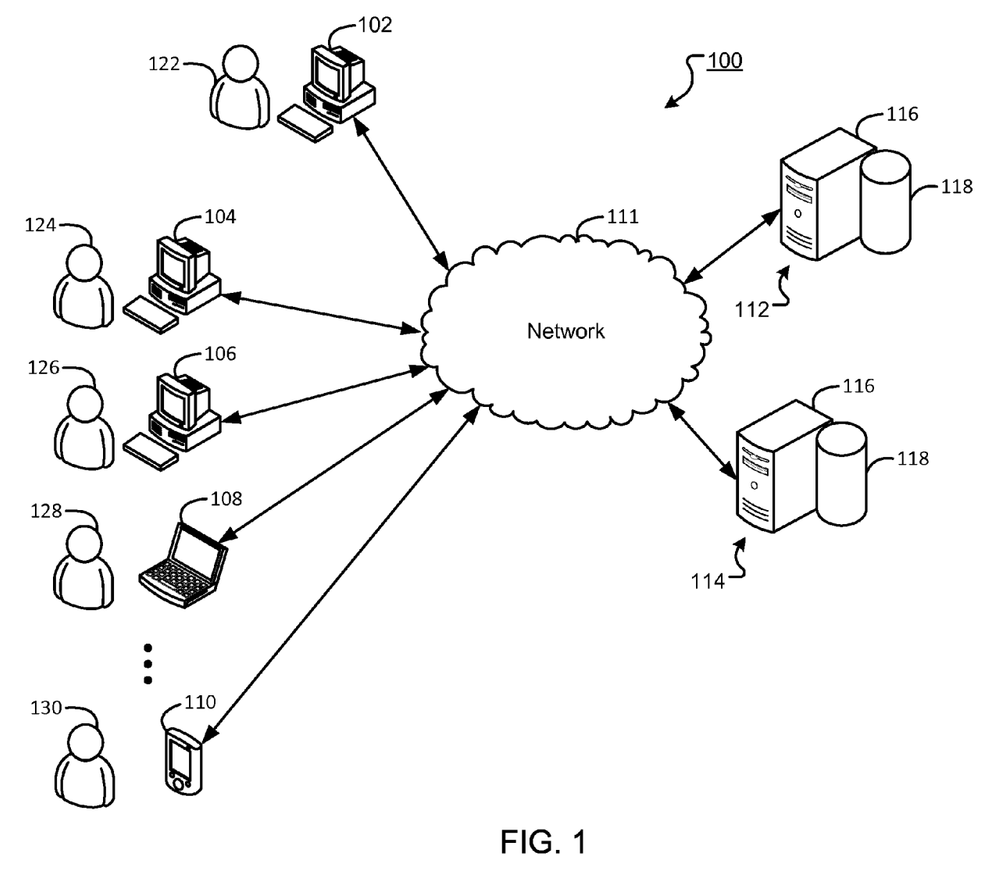
FIG. 1 is a block diagram showing an example network environment on which the process described herein for inferring a social affinity based on interactions with search results may be implemented.

FIG. 1 is a block diagram showing an example network environment on which the process described herein for inferring a social affinity based on interactions with search results may be implemented. In this regard, FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include many thousands of Web sites, computing devices and servers, which are not shown.

The network 111 can include a large computer network, examples of which include a local area network (LAN), wide area network (WAN), the Internet, a cellular network, or a combination thereof connecting a number of mobile computing devices, fixed computing devices, and server systems. The network(s) may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, for example, using a Bluetooth, WiFi, or other such transceiver.

Computing devices 102 to 110 enable respective users 122 to 130 to access and to view documents, for example, Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
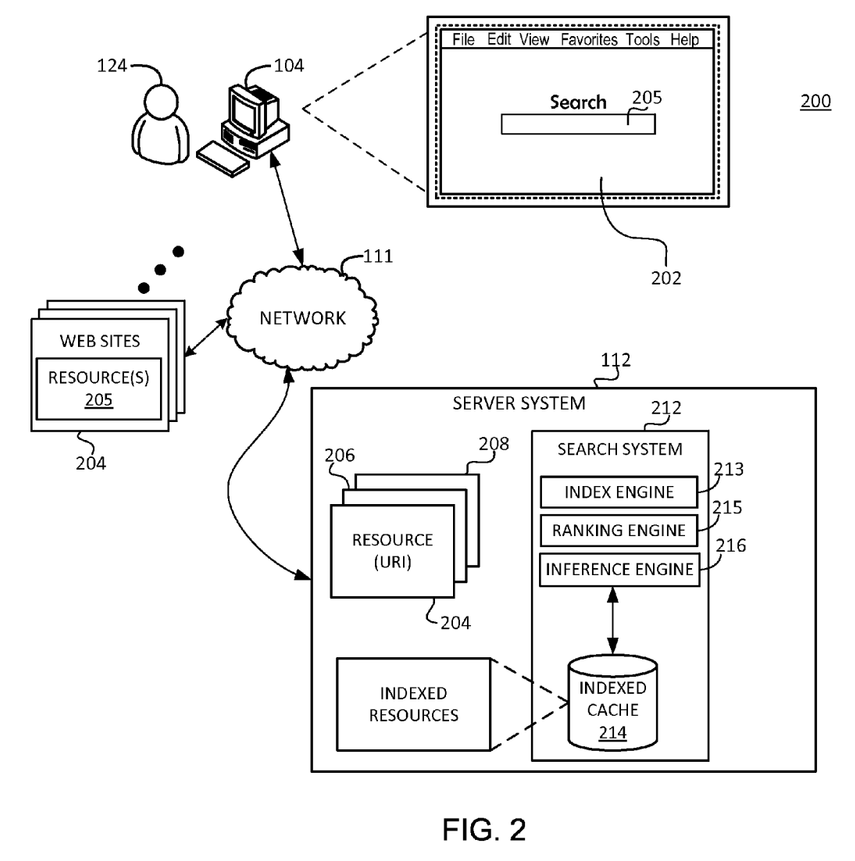
FIG. 2 is a block diagram of an example part of the network environment of FIG. 1.

FIG. 2 is a block diagram of an example part of the network environment of FIG. 1. In this regard, FIG. 2 shows a portion 200 of example network environment 100. In FIG. 2, computing device 104 communicates with server system 112 to display a Web page 202 of a Web site. Specifically, server system 112 stores a plurality of resources 204, 206, 208, each having an associated resource identifier (Resource ID). For example, the resource 204, 206, 208 can each correspond to different Web pages of the same Web site, or can correspond to Web pages of different Web sites.

To view a Web page, user 124 can input or select a Resource ID using a browser that is executed on computing device 104. The Resource ID can include, for example, a uniform resource indicator (URI) or a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page, through which a user may access a search system. The Web page may include a field 205 for inputting search terms that are transmitted to the search system. In response, the search system performs a search of an indexed cache, and returns a search results list to a user. The search results list may include, e.g., connections to content that is relevant to the search terms.

Referring to FIG. 2, network environment 100 includes a search system 212 that identifies resources 205 by crawling and indexing resources provided by content publishers on Web sites 204. In this regard, search system 212 may include an indexing engine 213 that indexes resources (e.g., Web pages, images, or news articles on the Internet). Data about the resources 205 can be indexed based on the resource 205 to which the data corresponds. The indexed and, optionally, cached copies of the resources 205 can be stored in an indexed cache 214. A ranking engine 215 (or other software) ranks the resources that match the query. Social graph information, an example of which is described below, can be included in a same index as other resources or in a separate index (not shown). Search system 212 also includes an inference engine 216 for inferring affinity of a user to a party based on interaction(s) with online content associated with that party, as described below with respect to FIG. 3. Search system 212 may be implemented, e.g., on server system 214 as shown or on other appropriate hardware.

In response to a search query, search system 212 can access indexed cache 214 to identify resources 205 that are relevant to the search query. Search system 212 identifies resources 205 in the form of search results 218 and returns the search results to a requesting device in search results pages. A search result may be data generated by search system 212 that identifies a resource 205, and that includes a link to the corresponding resource. An example search result can include a Web page title, a snippet of text or a portion of an image extracted from the Web page, and the URL (Unified Resource Location) of the Web page.

Search system 212 takes into account social affinities that the user has to others when obtaining and presenting search results to the user. For example, a user's affinity to another party may be used to change (either increase or decrease) the ranking of future search results related to that party. Such affinities may also be used to promote online connection between the party and other parties, e.g., through social networking services.

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of the social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party likes content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on contact's posts can result in a closer social connection than occasional endorsements. Affinity can change over time. For example, as the types or frequency of interactions change with members of the social graph, the resulting affinities can change as well.

Users can designate particular resources as endorsed, share resources, quote URLs, or otherwise indicate an interest or liking of content, examples of which include a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., through a browser control or user interface element presented with the associated content).

A social graph is one way to represent connection between two parties, which may, or may not, be on the same social networking service. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph can include connections within a single network or across multiple networks.

Distinct social graphs can be generated for different types of connections. For example, a user can be connected with chat contacts in one social graph, email contacts in a second social graph, and connections from a particular social network in a third social graph. Each social graph can include edges to additional parties at greater degrees of separation from the user. For example, an email contact can have its own email contacts to others adding a degree of separation from the user (e.g., user→email contact→contact of email contact). These contacts can, in turn, can have additional contacts at another degree of separation from the user. Similarly, a party's connection to someone in a particular social network can be used to identify additional connections based on that person's connections. Distinct social graphs can include edges connecting one or more social graph to one or more other social graphs. Thus, a social graph can include a single social graph or multiple interconnected social graphs.

Affinity between members of a social graph can be represented by edges, e.g., in a database that stores data for the social graph. These edges can be weighted, either in that database or elsewhere, to reflect a level of affinity between two parties connected in the social graph. Affinity between parties can be content specific. For example, social graph data may identify specific types of content associated with an edge between parties and specific affinities for that content. For example, the social graph data may specify that, between two connected parties, the first party has a first level of affinity for the second party's videos and a second, different level of affinity for the second party's written work. Similarly, the social graph may specify that the second party has a third, different level of affinity for the first party's blogs.

Figure 3:
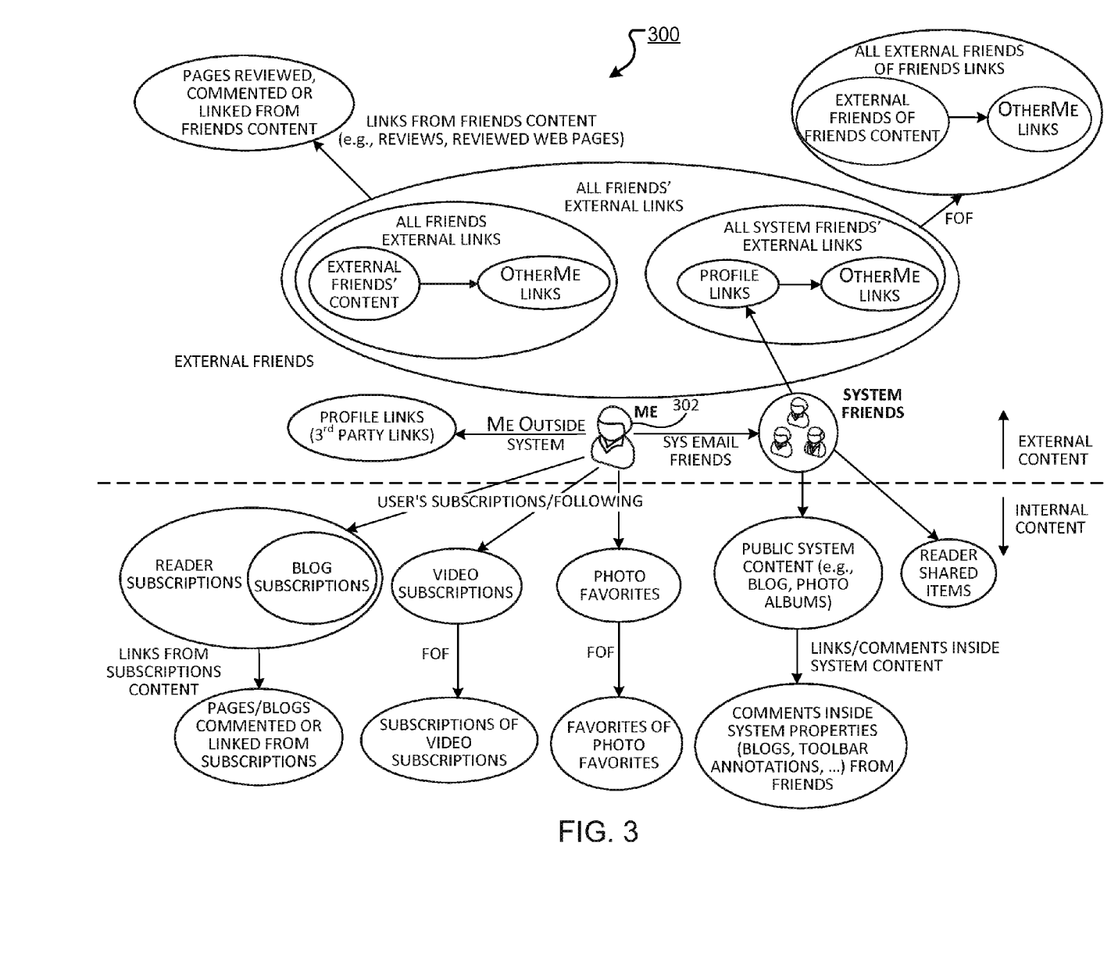
FIG. 3 is a conceptual view of an example social graph.

FIG. 3 is a conceptual view of an example social graph 300. In this regard, FIG. 3 shows sources of information for a social graph. In this example, the user's social graph is a collection of connections (e.g., users, resources, etc.) identified as having a relationship to the user 302 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

Diagram 300 shows a user 302 and the different connections that are possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes links to resources as well as contacts of the respective contacts. In another example, a user may be connected to a social networking account. That social networking account may reference an article in a newspaper. A social connection, therefore, may be established between the user and the author of the article.

In some implementations, the connections to a user within a specified number of degrees of separation can be considered the social graph of the user. Membership and degree of separation in the social graph may be based on other factors, including a frequency of interaction. For example, a frequency of interaction by the user (e.g., how often the user visits a particular social networking site) or type of interaction (e.g., endorsing, selecting, or not selecting items associated with contacts). As interaction changes, the relationship of a particular contact in the social graph can also dynamically change. Thus, the social graph can be dynamic rather than static.

Figure 4:
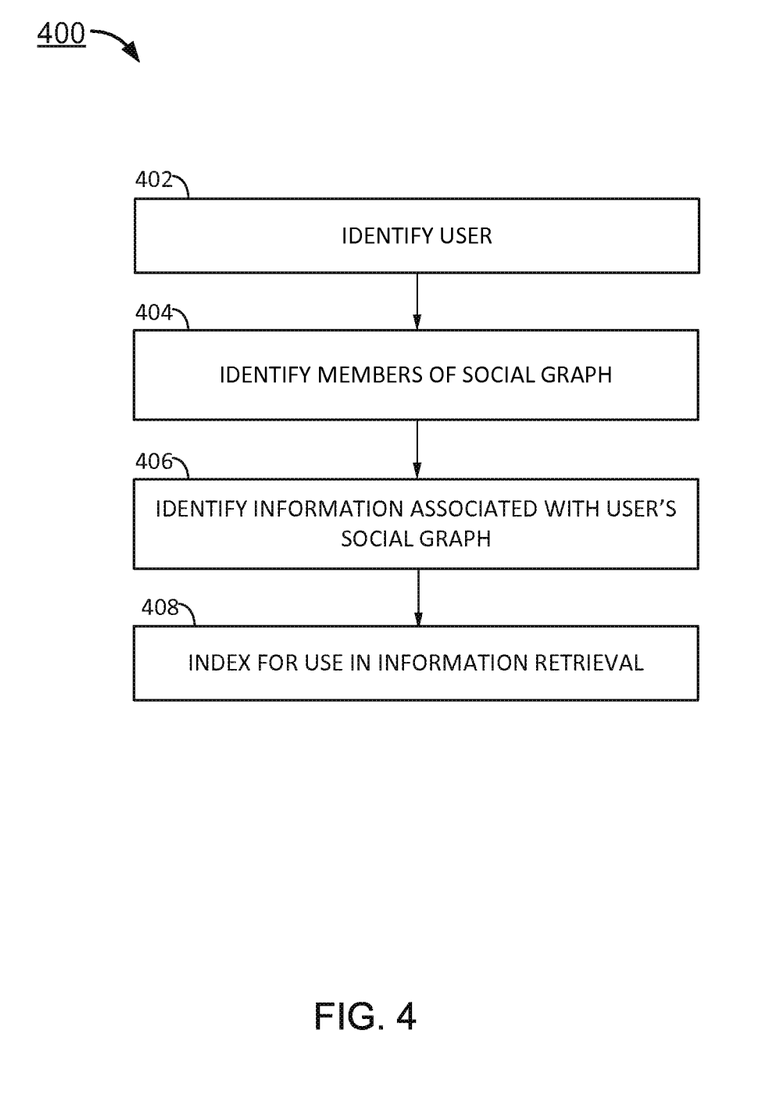
FIG. 4 is a flowchart showing an example process for creating a social graph.

FIG. 4 is a flowchart showing an example process for creating a social graph. In this regard, FIG. 4 shows a process 400 for determining a user's social graph information. Likewise, process 400 may be used to update the user's social graph. Process 400 may be performed on an on-going basis by a dedicated engine in search system 212, e.g., before, or concurrent with, process 500 (FIG. 5 below) for inferring affinity between parties. The information obtained by process 500 may be available to, and used by, process 400, to update the user's social graph.

Process 400 identifies (402) a user. The user can be identified, for example, based on a profile associated with the user. The profile can be accessed, e.g., by referencing a username, email address, or other identifier. This information may be obtained by a login or other appropriate process.

Process 400 obtains information that is used to construct the user's social graph. In this example, the user's social graph identifies people and resources associated with the user, e.g., in which the user an interest. In some implementations, the social graph is limited to a specified number of degrees of separation from the user or to particular relationships or types of interaction with the user. In some implementations, the user's social graph may be generated by another system and provided upon request.

Referring to FIG. 4, process 400 identifies (404) members of the user's social graph. The user's social graph may be constructed using user profile data, e.g., by extracting relevant information from users and resources identified in the user profile data. For example, a user's profile can include a list of the user's contacts. The user's contacts can include contacts within a system (e.g., using a same e-mail or chat service that is affiliated with system) or external to the system (e.g., social graphs or a list of contacts associated with third party applications or service providers). The profile can also include a list of subscriptions to which the user belongs (e.g., identifying content that the user follows, for example, particular blogs or feeds), from which members of the user's social graph can be inferred.

The user's profile can also identify aliases used by the user (e.g., as associated with particular content providers or social graph sources). For example, a user may have a first identity for a chat application and a second identity for a restaurant review Web site. These two identities can be connected in order to unify online content associated with that user.

A user can prevent addition of members to the user's social graph, e.g., through an option or by keeping contacts out of particular groups used by process 400 to generate the social graph. In some other implementations, privacy features provide a user with an option to allow or to prevent, respectively, being included (or removed if already included) as a member of another's social graph. Thus, users can have control over what personal information or connection information, if existing, is included in their social graphs.

Process 400 identifies (408) information associated with the user's social graph. Identified information associated with the user's social graph can include, for example, content or posting to resources subscribed to by the user (e.g., blogs). The identified information can also include content generated by members of the user's social graph. For example, members of a user's social graph can generate content including, for example, local reviews (e.g., for restaurants or services), video reviews and ratings, product reviews, book reviews, blog comments, news comments, maps, public Web annotations, public documents, streaming updates, photos and photo albums. Thus, the content can include both content generated by members of the user's social graph, and content endorsed, reviewed or annotated by members of the user's social graph. The user's profile can also include external links identified by the user. These links can identify particular content of interest.

The social graph can be expanded by extracting information from identified people and content in the user's profile. For example, public profile information from social networking services can exist for identified contacts, from which information can be extracted (e.g., their contacts, links, and subscriptions). In some implementations, the user can adjust the members of their social graph directly. For example, the user can group their contacts (e.g., e-mail contacts) into groups accessed by process 400 in building the user's social graph.

Process 400 indexes (408) the identified social graph information for use in information retrieval. The social graph information may be part of a database in the indexed cache 214 of FIG. 2. By way of example, the index can be searched in response to a received search query to identify relevant search results associated with members of the user's social graph. For example, a search system can receive a query and identify both general search results as well as search results based on the indexed social graph information. In some implementations, the indexed social graph information may be updated intermittently or periodically, for example, to include recently added information associated with the user's social graph. The indexed social graph information may also be updated, e.g., on an on-going basis, to include information about affinities inferred from interaction with the content by a particular author, user, etc., as described below with respect to FIG. 5.

In some implementations, user interests and disinterests can be inferred based on user activity, and the resulting inferred information can be incorporated into a user's online profile or social graph. As an example, a user's search logs or search history can be used to determine which Web pages the user has visited. If, for example, Web histories for the user indicate that the user spent a significant amount of time on sports-related Websites, then an inference can be made that the user is interested in sports. Furthermore, the relative number of sports-related Websites visited and/or the relative amount of time that the user spent on the Web sites can indicate the degree of interest of the user. Conversely, by not visiting politically-related Websites, or by quickly clicking away from such Web sites, an inference can be made that the user is not interested in politics. The authors of the content that the user has accessed, the subjects of that content, or other appropriate features of the content may be incorporated into the user's social graph.

In this regard, in some implementations, search logs and search histories can be anonymized so that the privacy of users is protected. For example, quasi-unique identifiers can be associated with users, but the actual identifying information of the users is not stored in the search logs. Additionally, identified user preferences or user interactions can be generalized (for example, generalized based on user demographics) rather than associated with a particular user. Encryption and obfuscation techniques can also be used to protect the privacy of users.

Figure 5:
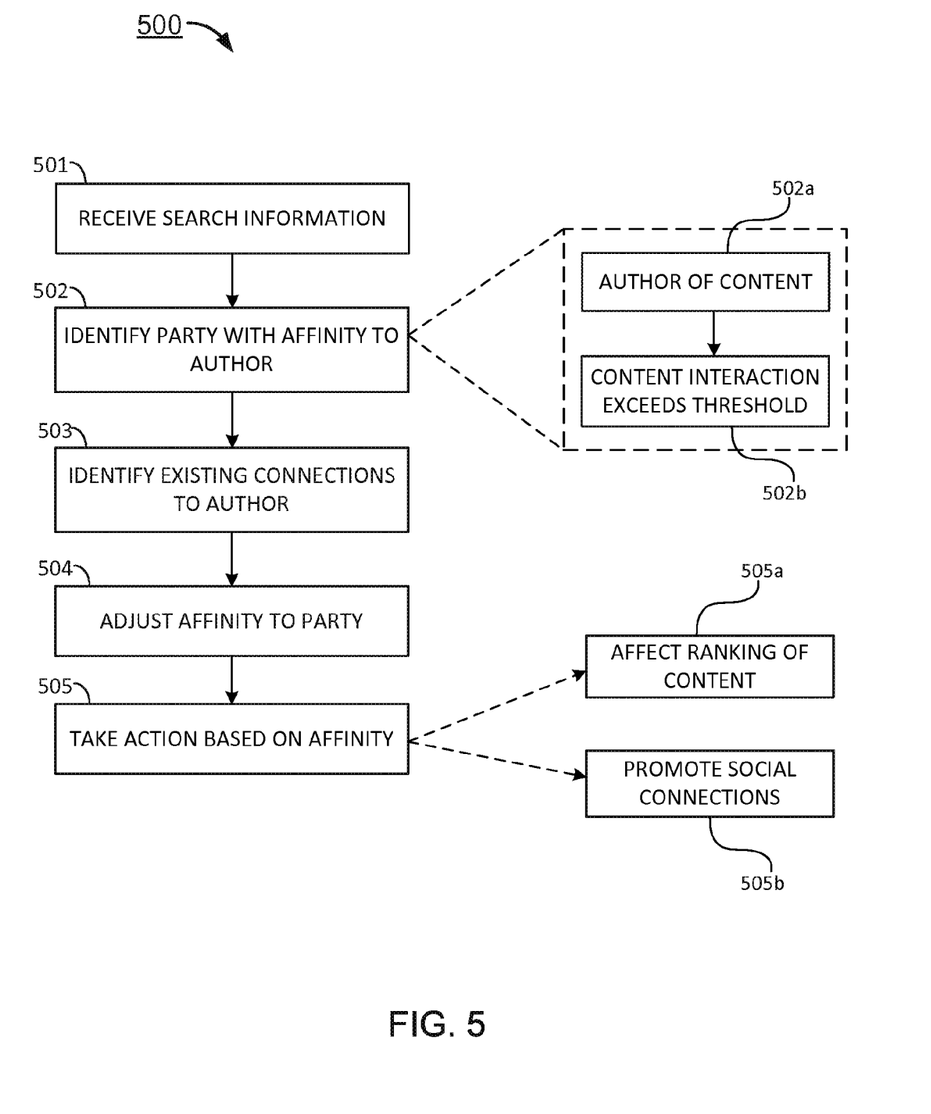
FIG. 5 is a flowchart showing an example process of inferring a social affinity based on interactions with search results.

FIG. 5 is a flowchart showing an example process of inferring a social affinity based on interactions with search results. In this regard, FIG. 5 shows a process 500 for inferring affinity of a user to a party based on interaction(s) with online content associated with that party. Process 500 may be performed by inference engine 216 in search system 212.

Process 500 receives (501) information from a search conducted online by a user, e.g., user 124 of FIG. 2. The information may identify both content retrieved from one or more network resources (e.g., Web sites) identified by the search, and an interaction with that content. Interaction may include, e.g., selecting the content for viewing, or receiving the content but not selecting the content. The interaction is considered repetitive in the sense that the user repeatedly performs an action, for example, selecting/clicking on content associated with an author. An action is deemed repetitive, for example, if the action is repeated more than a threshold number of times within a defined time frame. For example, if that content is selected one the order of 10's or 100's of times within a time frame, e.g., a day, a week, or a month, then that action is considered repetitive.

The search information may be generated by search system 212 in response to receipt of a search query from a user. For example, user 124 can input a search query into a search interface (e.g., Web page) of search system 212. The search query includes one or more terms and can be general or directed to particular types of resources (e.g., a Web search or an image search).

When the search query is received by search system 212, the search system identifies resources that are responsive to the search query using indexed cache 214. The resulting search information may include information from social networking services, blogs, Web sites, and other publicly-available resources. That information may also specify the user's interaction with the content.

Process 500 performs operations to identify (502) a party that is associated with the search information and with which the user has an affinity. For example, process 500 may identify (502*a*) an author of content identified in the search information. An author can include, for example a creator, a publisher, or other party responsible for disseminating the content. The author may be identified from text or images in the content, from metadata associated with the content, from references to the content in other content, from a user's social graph, or from other appropriate publicly-available or private, authorized source.

When determining whether to identify the party, process 500 also considers the user's interaction (502*b*) with content authored by that party. More specifically, in this example, process 500 considers whether the user's pattern of interactions with that content exceed a threshold. This threshold may be pre-set in inference engine 216, or the threshold may be set dynamically based, e.g., on circumstances surrounding the search. For example, if a user is searching specifically for articles by that author, the threshold may be less than if the search is a general search. Process 500 may identify spam accounts and disregard content interactions with those accounts when identifying (502) a party.

Process 500 will not identify (502) a party, and therefore will not associate an affinity to a party, unless the user's interactions with content authored by that party meet or exceed the threshold. For example, process 500 may determine that the number of times a user selected content from a particular author (e.g., clicked on a link to a Web site by that author) exceeds a value (the threshold). In another example, the threshold may require that a user has spent a minimum amount of time reviewing content by an author. After the threshold is met or exceeded, process 500 infers that the user has an affinity to the author.

The affinity of the user to the author may fall along a spectrum, and may generally be defined as being between upper and lower bounds. The number of content interactions may affect the degree of the affinity. For example, if the user selects a certain percentage (e.g., more than 50%) of content from the author (e.g., relative to the amount of content provided in search results), then process 500 may infer a greater social connection to the author. The converse also applies. For example, if the user selects a relatively a different percentage of content (e.g., less than 50%) from the author (but still above the threshold), process 500 may infer a lesser social connection to the author. The degree of affinity to the author may affect later actions taken, as described below.

Process 500 identifies (503) social connections between the user and the author, if existing, in the user's social graph.

In this regard, appropriate information, if available, from the user's existing social graph, including, but not limited to, the social graph information described herein, may be used to infer a degree of affinity to the author. In some implementations, no, or little, social graph information may be available for the user, for the author, or between the user and the author. In these cases, consideration of existing social graph information may be omitted or given weight appropriate to the amount of information available. In some implementations, an inference of affinity (rather than just the degree of affinity) may require taking into account information from the user's social graph. In this regard, information about the user's social connections may be identified by searching the indexed social graph information (e.g., in index cache 214 of FIG. 2).

By way of example, if the user has the requisite number of content interactions with an author, and the user has a pre-existing social connection to the author, then the degree of affinity to the author may indicate a stronger connection to the author than if there were no pre-existing social connection. For instance, the following types of social connections may enhance the degree of affinity to the author: the user may follow a blog that includes posts by the author, the user may be within a social circle of the author on a social networking service, the user may be a contact of a contact of the author on the social networking service, the user may have previously endorsed content of the author somewhere on the Internet, the user and the author may interact with the same content regularly or frequently, the user and author may interact with the same people regularly or frequently, and so forth. It is noted that these examples are representative only, and that appropriate information from the user's social graph may be used to affect the user's affinity, as noted above.

The inferred affinity of the user to the author may also be used to adjust (504) existing connections on the user's social graph. That is, the degree of affinity determined above may be reflected in the user's social graph. For example, existing connections may be strengthened or otherwise modified accordingly. Connections in a user's social graph may be adjusted/updated, added or removed in the manner described above with respect to FIG. 4.

Instead of enhancing a social connection between the user and the author, an inferred affinity may be used to decrease the degree of affinity between the user and the author in the user's social graph. For example, if the user is presented with content from the author frequently, and does not select that content (e.g., the user ignores the content or mouses-over the content without selecting it), then process 500 may infer that the user dislikes that author. If this behavior exceeds a threshold, process 500 will infer a lesser connection that author. If that degree of affinity is not already reflected in the user's social graph, the user's social graph may be modified accordingly. For example, connections between the user and the author may be severed in the social graph, distances between the user and the author may be increased in the user's social graph, weights on edges of the social graph may be lowered, etc. Other appropriate action may be taken in the user's social graph to reflect the decreased affinity.

Process 500 may take one or more actions (505) based on the new or adjusted affinity of the user and the author. By way of example, the inferred affinity (which may, or may not, be influenced by information from the user's social graph or elsewhere) may be used to affect (505*a*) a ranking of future search results, and/or to promote (505*b*) an online social connection between the user and the author.

In an implementation, when the affinity is positive, process 500 may promote future search results associated with the author over search results not associated with author. For example, process 500 may rank future search results associated with the author as being more relevant than search results not associated with the author in results pages (e.g., on the first page or at the top of the search results). When ranking the search results, process 500 may also take into account the relevance the author's content to search terms provided in the user's initial search query. Ranking of search results can also be affected by other factors, e.g., an information retrieval score of social graph content relative to the submitted query (e.g., relevance of the social graph content), content type (e.g., blogs versus images), and the date of the associated content.

In an example where the affinity is negative or if the affinity has decreased, process 500 may affect a ranking of future search results, e.g., by ranking future search results not associated with author as being more relevant than search results associated with the author. For example, content from the author may be ranked lower on the search results list than other relevant content. As above, other factors may also affect the ranking.

In some cases, process 500 may determine that the user has an affinity to only certain content provided by an author. For example, the user may have a positive affinity for an author's posts about cooking, but no affinity for the user's other posts. Accordingly, process 500 may also identify the subject of content provided by a particular author. This may be done by referencing keywords in the content, by referencing third party sources relating to the document, or by other appropriate mechanisms. Process 500 may, in these instances, promote only content by the author that includes the identified subject. For example, process 500 may promote, in a search results list, only to content by the author that includes the identified subject. For example, process 500 may promote an author's posts about cooking, but not promote that same author's posts about the Red Sox. If the affinity is a negative affinity to particular subject by an author, process 500 may demote search results for the author only for that subject. As was the case above, ranking of search results in these instances can also be affected by other factors, e.g., an information retrieval score of social graph content relative to the submitted query (e.g., relevance of the social graph content), content type (e.g., blogs versus images), and the date of the associated content.

In some implementations, the search results may include a line, e.g., underneath a snippet and a URL of a search result, which includes a picture of a contact who interacted with that result, a name of that contact, and a link to a profile of the contact on the social networking service. The display may also include an explanation of why this information is there, e.g., you are connected to that contact socially, that contact endorsed or shared that content, and so forth.

Search results presented by process 500 are thus customized based on a user's social graph. So, the same search query may produce search results for a first user that are presented differently than search results for a second user.

Process 500 is not limited to affecting the ranking of search results, but rather may be used to affect ranking of content provided to a user. For example, ranking of content in a content stream may be influenced by an affinity inferred in accordance with process 500. In this context, a content stream may include appropriate electronic (e.g., Web-based) content, for example, messages, links, images, and the like that is provided by a service for display to a user.

In addition to affecting ranking of content, process 500 may take other action based on an inferred affinity between a user and an author, taken alone or influenced by existing social graph information. For example, process 500 may promote an online social connection between the user and the author, e.g., by suggesting that the user and the author connect through an online social networking service. In an example, process 500 may instruct the social networking service to suggest that the user connect to, follow, etc., the author, and vice versa.

If the user and the author are already connected through an online social networking service, process 500 may provide the user and author with options to increase their online social connection. For example, process 500 may suggest that the user and the author connect through a second social networking service. Process 500 may suggest that the user subscribe to a blog by the author. Other appropriate suggestion may be made to increase the online social connection.

Figure 6:
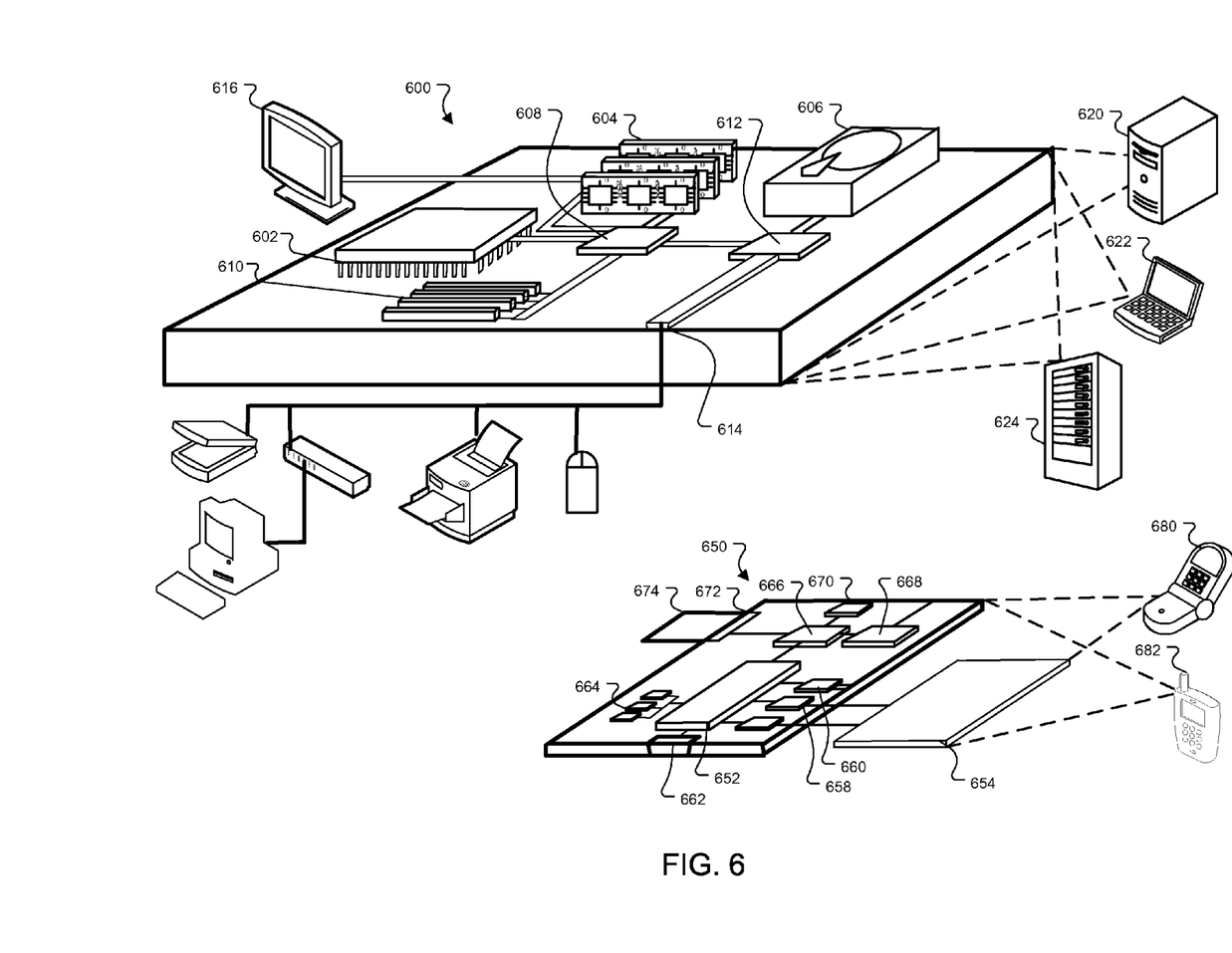
FIG. 6 shows examples of computing devices on which the processes described herein, or portions thereof, may be implemented.

FIG. 6 shows examples of computing devices on which the processes described herein, or portions thereof, may be implemented. In this regard, FIG. 6 shows an example of a generic computing device 600 and a generic mobile computing device 650, which may be used to implement the processes described herein or portions thereof. For example, search system 212 may be implemented on computing device 600. Mobile computing device 650 may represent a client device of FIG. 1. Other client devices of FIG. 1 may also have the architecture of computing device 600.

Computing device 600 is intended to represent various forms of digital computers, examples of which include laptops, desktops, workstations, personal digital assistants, servers, blade servers, mainframes, and other appropriate computers. Computing device 650 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the embodiments described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, for example, display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, examples of which include a magnetic or optical disk.

The storage device 606 is capable of providing mass storage for the computing device 600. In one implementation, the storage device 606 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer, for example, a laptop computer 622. Alternatively, components from computing device 600 may be combined with other components in a mobile device (not shown), for example, device 650. Each of such devices may contain one or more of computing device 600, 650, and an entire system may be made up of multiple computing devices 600, 650 communicating with each other.

Computing device 650 includes a processor 652, memory 664, an input/output device for example, a display 654, a communication interface 666, and a transceiver 668, among other components. The device 650 may also be provided with a storage device, for example, a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, for example, control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, for example, using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, for example, through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed herein collect personal information about users, the users may be provided with an opportunity to enable/disable programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (for example, to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method performed by one or more processing devices, comprising:
    obtaining information derived from a search initiated by a first party, the information specifying i) particular content retrieved from one or more network resources identified by the search, the particular content associated with a subject, and ii) one or more interactions by the first party with the particular content;
    determining, based on the information, that an amount of the interaction of the first party with the particular content satisfies a threshold;
    in response to determining that the interaction of the first party with the particular content satisfies the threshold, identifying a second party that authored the particular content;
    determining that the first party has a pre-existing social connection with the second party in a social graph associated with the first party;
    in response to determining that the first party has the pre-existing social connection with the second party, adjusting, in the social graph associated with the first party, an affinity for the particular content associated with the second party with respect to the first party based on the amount of the interaction with the content authored by the second party; and
    updating search result rankings based on the affinity for the particular content to promote one or more first search results provided to the first party that contain additional content authored by the second party and ii) associated with the subject, while maintaining a ranking of one or more second search results provided to the first party that contain additional content i) authored by the second party and ii) independent of association with the subject.

2. The method of claim 1, wherein the affinity is a positive affinity, and wherein updating the search result rankings further comprises ranking the one or more first search results as being more relevant than remaining search results.

3. The method of claim 2, wherein updating the search result rankings further comprises updating the search results rankings based on relevance to search terms in the additional content authored by the second party.

4. The method of claim 1, wherein the interaction comprises failure to select the particular content and, as a result, the affinity is a negative affinity, and
    wherein updating the search result rankings comprises ranking the one or more first search results as being less relevant than remaining search results.

5. The method of claim 1, wherein the affinity of the second party with respect to the first party falls along a spectrum, and wherein updating the search results rankings is further based on a where, on the spectrum, the affinity falls.

6. The method of claim 1, further comprising:
    updating the social connection in the social graph between the first party and the second party based on the affinity, wherein the social connection is used to promote the one or more first search results.

7. The method of claim 6, wherein updating the social connection further comprises providing the first party with an option to increase the social connection between the first party and the second party.

8. One or more non-transitory machine-readable media storing instructions that are executable by one or more processing devices to perform operations comprising:
    obtaining information derived from a search initiated by a first party, the information specifying i) particular content retrieved from one or more network resources identified by the search, the particular content associated with a subject, and ii) one or more interactions by the first party with the particular content;
    determining, based on the information, that an amount of the interaction of the first party with the particular content satisfies a threshold;
    in response to determining that the interaction of the first party with the particular content satisfies the threshold, identifying a second party that authored the particular content;
    determining that the first party has a pre-existing social connection with the second party in a social graph associated with the first party;
    in response to determining that the first party has the pre-existing social connection with the second party, adjusting, in the social graph associated with the first party, an affinity for the particular content associated with the second party with respect to the first party based on the amount of the interaction with the content authored by the second party; and
    updating search result rankings based on the affinity for the particular content to promote one or more first search results provided to the first party that contain additional content authored by the second party and ii) associated with the subject, while maintaining a ranking of one or more second search results provided to the first party that contain additional content i) authored by the second party and ii) independent of association with the subject.

9. The one or more non-transitory machine-readable media of claim 8, wherein the affinity is a positive affinity, and wherein updating the search result rankings further comprises ranking the one or more first search results as being more relevant than remaining search results.

10. The one or more non-transitory machine-readable media of claim 9, wherein updating the search results rankings further comprises updating the search results rankings based on relevance to search terms in the additional content authored by the second party.

11. The one or more non-transitory machine-readable media of claim 8, wherein the interaction comprises failure to select the particular content and, as a result, the affinity is a negative affinity, and
wherein updating the search result rankings comprises ranking the one or more first search results as being less relevant than remaining search results.

12. The one or more non-transitory machine-readable media of claim 8, wherein the affinity of the second party with respect to the first party falls along a spectrum, and wherein updating the search results rankings is further based on a where, on the spectrum, the affinity falls.

13. The one or more non-transitory machine-readable media of claim 8, wherein the operations comprise:
updating the social connection in the social graph between the first party and the second party based on the affinity,
wherein the social connection is used to promote the one or more first search results.

14. The one or more non-transitory machine-readable media of claim 13, wherein updating the social connection further comprises providing the first party with an option to increase the social connection between the first party and the second party.

15. A system comprising:
non-transitory memory storing instructions that are executable; and
one or more processing devices executing the instructions to perform operations comprising:
obtaining information derived from a search initiated by a first party, the information specifying i) content retrieved from one or more network resources identified by the search, and ii) one or more interactions by the first party with the content;
obtaining information derived from a search initiated by a first party, the information specifying i) particular content retrieved from one or more network resources identified by the search, the particular content associated with a subject, and ii) one or more interactions by the first party with the particular content;
determining, based on the information, that an amount of the interaction of the first party with the particular content satisfies a threshold;
in response to determining that the interaction of the first party with the particular content satisfies the threshold, identifying a second party that authored the particular content;
determining that the first party has a pre-existing social connection with the second party in a social graph associated with the first party;
in response to determining that the first party has the pre-existing social connection with the second party, adjusting, in the social graph associated with the first party, an affinity for the particular content associated with the second party with respect to the first party based on the amount of the interaction with the content authored by the second party; and
updating search result rankings based on the affinity for the particular content to promote one or more first search results provided to the first party that contain additional content i) authored by the second party and ii) associated with the subject, while maintaining a ranking of one or more second search results provided to the first party that contain additional content i) authored by the second party and ii) independent of association with the subject.

16. The system of claim 15, wherein the affinity is a positive affinity, and wherein updating the search result rankings further comprises ranking the one or more first search results as being more relevant than remaining search results.

* * * * *